G. MACLOSKIE.
AIR BRAKE SYSTEM.
APPLICATION FILED JULY 25, 1918.

1,297,884.

Patented Mar. 18, 1919.

Inventor:
George Macloskie,
by Albert G. Davis
His Attorney

UNITED STATES PATENT OFFICE.

GEORGE MACLOSKIE, OF ERIE, PENNSYLVANIA, ASSIGNOR TO GENERAL ELECTRIC COMPANY, A CORPORATION OF NEW YORK.

AIR-BRAKE SYSTEM.

1,297,884.

Specification of Letters Patent.

Patented Mar. 18, 1919.

Application filed July 25, 1918. Serial No. 246,626.

*To all whom it may concern:*

Be it known that I, GEORGE MACLOSKIE, a citizen of the United States, residing at Erie, in the county of Erie, State of Pennsylvania, have invented certain new and useful Improvements in Air-Brake Systems, of which the following is a specification.

My invention relates to a braking system for a vehicle and has for its object the improvement of a device of this character.

My invention is more particularly applicable to a straight air braking system with an emergency feature of the general character disclosed in my prior Patent #910,402 which was issued January 19, 1909. In that system two train lines are provided, one of which is connected through the emergency valve to the main reservoir, and the other of which is connected through the emergency valve to the brake cylinder. The two lines are connected together by the motorman's valve, which, when moved to the application position, permits fluid pressure to pass from the main reservoir through the emergency valve to that train line which is known as the emergency line, and through the motorman's valve to the train line and again through the emergency valve to the brake cylinder. During the ordinary operation of the system, the emergency valve is not moved. In case an emergency application of the brakes is made, however, as when the train breaks in two, the emergency valve is depressed and the main reservoir is connected directly to the brake cylinder.

It has hitherto been proposed to provide the emergency valve with a small opening so that after an emergency application has been made and the emergency line repaired, the latter may be charged from the main reservoir. An objection has been made to this arrangement, however, for the reason that if the emergency valve has been moved to the emergency position by the opening of the emergency line and the compressors happen to be at that time out of service, the pressure in the main reservoir and consequently the braking power, would be reduced by the air escaping through the port. The result would be that the brake would leak off and under some conditions an accident might result.

In accordance with my present invention no port is provided in the emergency valve and I provide a second main reservoir, the two reservoirs being so related that a source of fluid pressure is always connected to the emergency valve.

Figure 1:
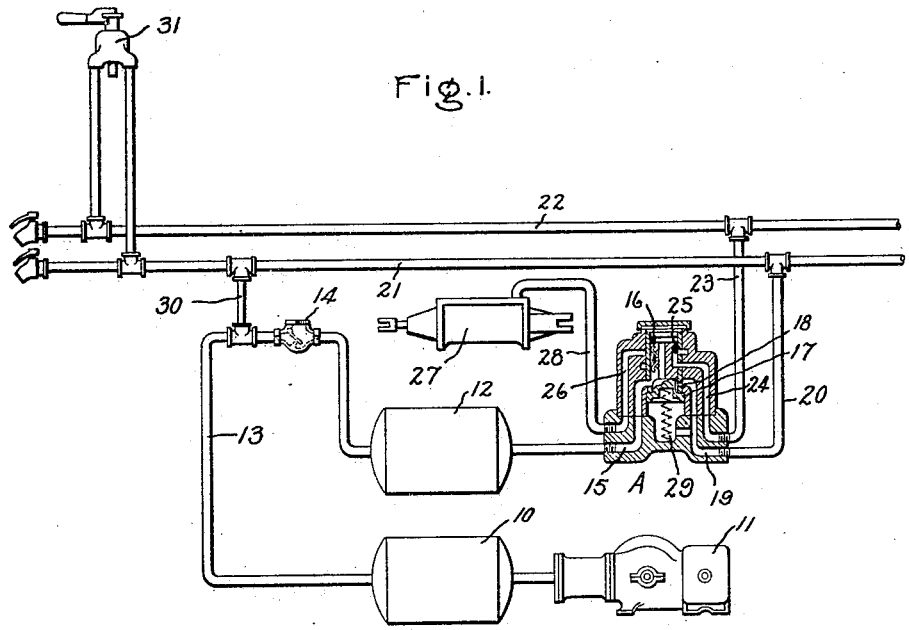
Figure 2:
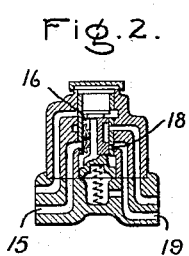

My invention will best be understood by reference to the accompanying drawing in which Figure 1 is a diagrammatic view of an air brake system embodying my invention showing the emergency valve in section; Fig. 2 is a sectional view of the emergency valve showing the valve piston moved to the emergency position.

Referring now to the drawings, 10 is a main reservoir supplied with fluid pressure by an ordinary compressor 11. The reservoir 10 is connected to a second reservoir 12 by a pipe 13 through a check valve 14 which permits air to pass from the reservoir 10 to the reservoir 12, but prevents passage of air from the reservoir 12 to the reservoir 10. The reservoir 12 is connected to a passage 15 in the emergency valve A. The passage 15 communicates with a chamber 16 above the piston 17 and through a restricted port 18 in the valve seat of the emergency valve with a passage 19, the latter being connected by a pipe 20 with the train pipe 21. A second train pipe 22 is connected by a pipe 23 to passage 24 in the emergency valve, the latter being connected through a recess 25 in the valve seat with the passage 26 which is connected to the brake cylinder 27 by a pipe 28. The piston 17 is normally kept in its elevated position by a spring 29. The train lines 21 and 22 are connected together by a motorman's valve 31.

With an ordinary straight air application of the brakes, the motorman's valve is moved to the application position and fluid pressure passes from the reservoir 12 through the emergency valve A to the emergency line 21 through the motorman's valve 23 to the train line 22 and through the pipe 23 and the emergency valve A to the brake cylinder 27. Thus during an ordinary straight air application of the brakes, the piston of the emergency valve is not moved. In order to release the brakes after a straight airbrake application, the motorman's valve is moved to release position in which case the brake cylinder communicates with the atmosphere through the train line 22 and the motorman's valve in a well understood manner.

When an emergency application of the brakes is made as by the breaking of the train line, the sudden drop in pressure below the piston of the emergency valve permits the reservoir pressure on the upper side of the valve to depress the piston to the position shown in Fig. 2. In this position of the valve, the main reservoir 12 is cut off from communication with the emergency line 21 and is connected directly to the brake cylinder through the space above the piston of the emergency valve as shown in Fig. 2. Now in order to permit the charging of the emergency line after an emergency application has been made and the train line repaired, I provide a by-pass 30 having a restricted opening which connects the pipe 13 between the reservoir 10 and the check valve 14 with the train line 21. At the same time it will be apparent that the reservoir 12 will always be charged with fluid pressure for the proper operation of the brakes, although the air compressor may temporarily be out of service and pressure may be removed from the reservoir 10 through the passage 30 and the emergency line 21.

While I have herein shown and described one modification of my invention, I do not desire to be limited to the exact arrangement shown and described but seek to cover in the appended claims all those modifications which come within the true spirit and scope of my invention.

What I claim as new and desire to secure by Letters Patent of the United States, is:

1. The combination with a braking system comprising a train line normally connected to a source of fluid pressure, a second train line normally connected to the brake cylinder and means for connecting the two train lines, of a second source of fluid pressure connected to said first source, a check valve for permitting pressure to pass from the second source to the first source in the one direction only and a restricted passage connecting said second source of fluid pressure to the first train line.

2. The combination with a braking system comprising a train line normally communicating with a main reservoir, a second train line normally communicating with the brake cylinder, and a manually operated device for connecting the two train lines, of a second main reservoir connected to the first, a check valve for permitting air to pass only from the second main reservoir to the first, and a by-pass for connecting the first train line to the passage between the second reservoir and the check valve.

In witness whereof, I have hereunto set my hand this 17th day of June, 1918.

GEORGE MACLOSKIE.

Copies of this patent may be obtained for five cents each, by addressing the "Commissioner of Patents, Washington, D. C."